Feb. 4, 1930.　　L. W. CHASE ET AL　　1,745,740
COMBINED LISTED CORN CULTIVATOR AND RIDGE LEVELER
Filed Dec. 12, 1924　　3 Sheets-Sheet 2
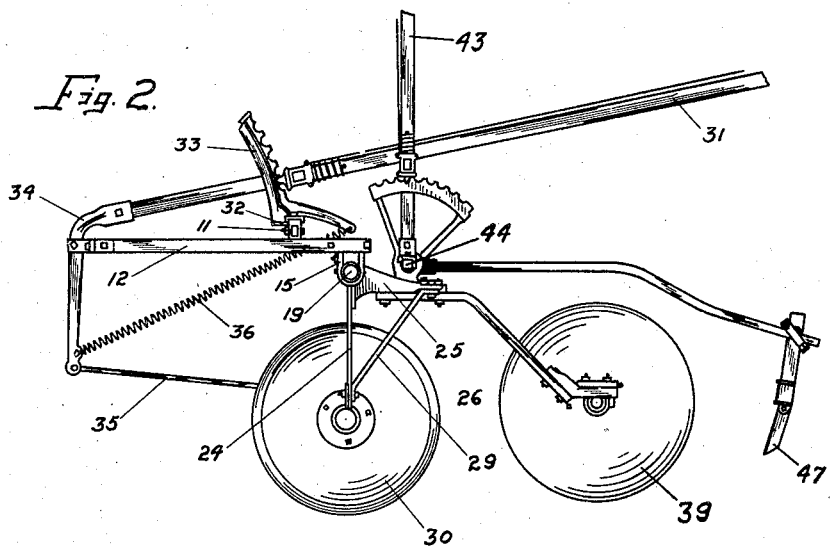
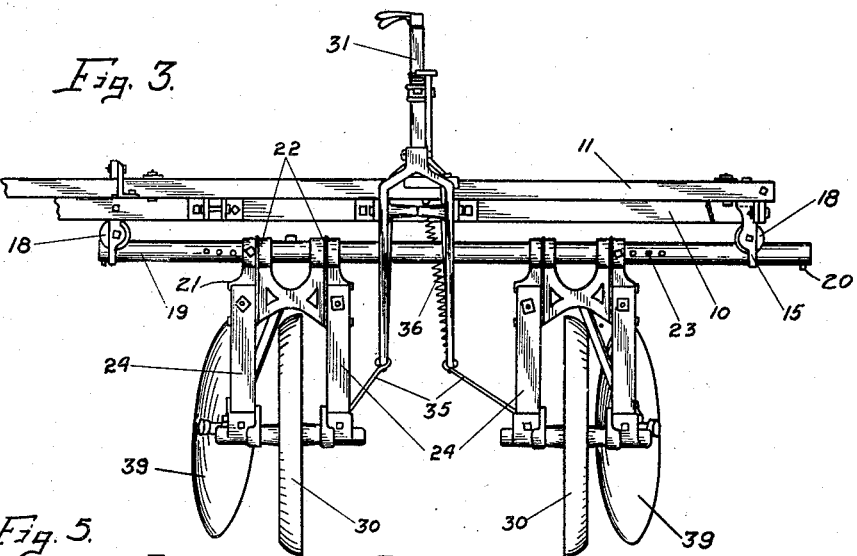
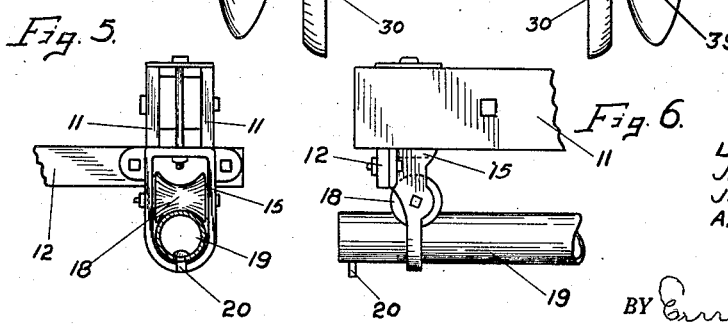
L. W. CHASE.
J. SMETHERS.
J. C. BRAND
A. H. BARNHART.
INVENTORS.
BY ～～～
ATTORNEY.

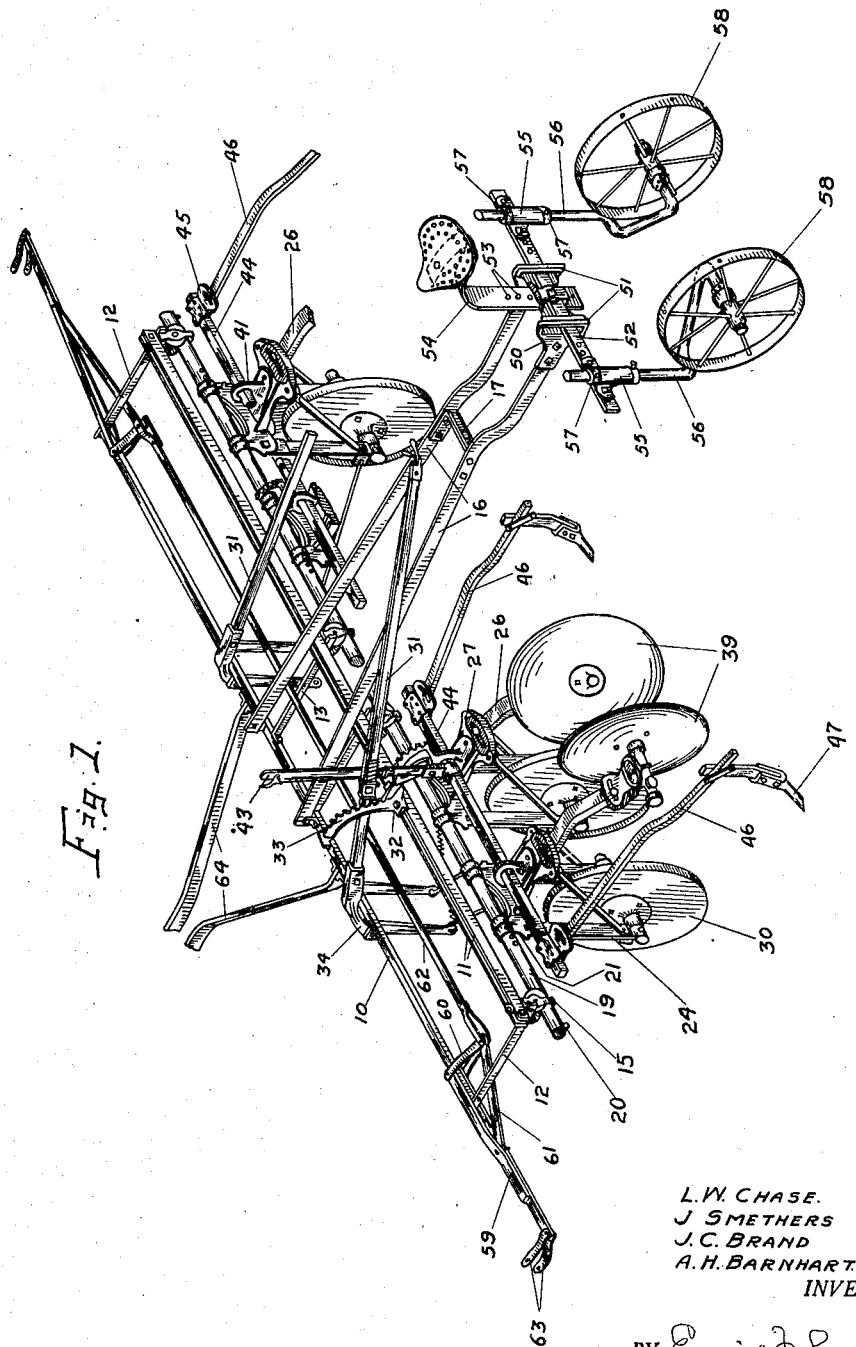

Patented Feb. 4, 1930

1,745,740

UNITED STATES PATENT OFFICE

LEON W. CHASE, JAMES SMETHERS, JAMES C. BRAND, AND ALEXANDER H. BARNHART, OF LINCOLN, NEBRASKA, ASSIGNORS TO CHASE PLOW COMPANY, OF LINCOLN, NEBRASKA, A CORPORATION OF NEBRASKA

COMBINED LISTED CORN CULTIVATOR AND RIDGE LEVELER

Application filed December 12, 1924. Serial No. 755,472.

Our invention relates to cultivators of the two-row type and it has for its object the provision of such an implement of great flexibility and adaptability so that it will function with the minimum of attention in the rough furrows between uneven rows of a field of listed corn, the adjustments being as nearly automatic as possible. It is also our object to provide a cultivator of such design that it will be adapted for use as a ridge "buster" for leveling lister ridges when preparing the seed bed. Other objects will be pointed out in the following description.

Referring now to the drawings,

Figure 1 is a view in perspective of the entire cultivator with the exception of the disc gang at the right, which is omitted to more clearly disclose the frame construction.

Figure 2 is a side elevation of the supports and adjusting devices of the cultivator discs and shovels.

Figure 3 is a front elevation of one of the cultivator gangs.

Figure 5 is an end view of the cultivator supporting beam and its connections, showing particularly the connections whereby the cultivators are automatically adjusted in the furrow.

Figure 6 is a front or rear view of the parts shown in Figure 5.

Figure 4:
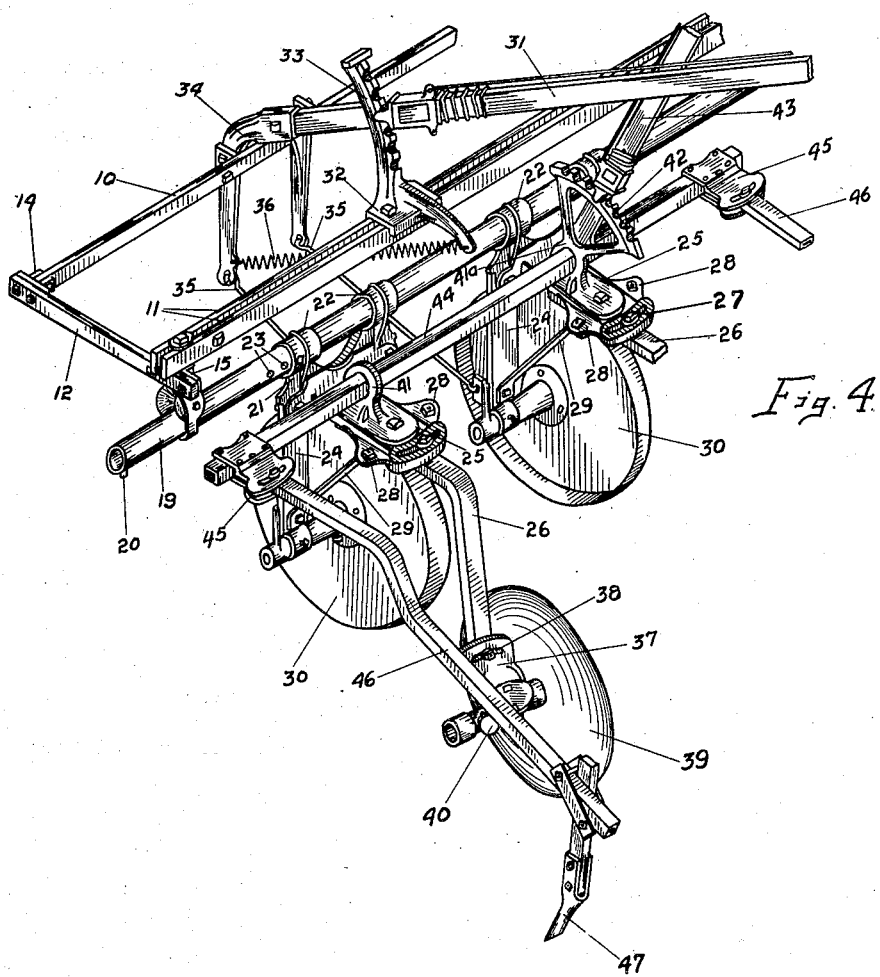
Figure 4 is a view in perspective of one of the cultivator gangs, showing particularly the frame construction and the adjustments for the discs and shovels.

The main frame includes a transversely positioned rectangular frame at the front, a rear truck, and a more or less V-shaped connecting frame between the front frame and the rear truck.

In the front frame, the forward beam is designated by the numeral 10, this beam being square in cross section and preferably hollow or tubular. At the rear of the beam 10 and spaced therefrom are two beams 11 of strap iron, the two beams 11 being bolted together in spaced relation and constituting in effect a single beam. The beams 11 are connected to the beam 10 by means of the straps 12 and 13. The straps 12 connecting the ends of the beams 10 and 11 are secured to castings which are driven into and secured to the beam 10, and at their rear ends they are connected to castings 15 which are secured to the under side of the beams 11. The straps 13 are L-shaped and they are secured to the inner side of the beam 10, their connections with the beams 11 being through the castings 15. The inner and outer castings 15 of each pair are identical but they are oppositely positioned for reasons which will be made apparent in the following description.

The beams 16 are positioned symmetrically with respect to and on opposite sides of the center line of draft of the implement. At the front ends they are secured to upstanding ears which are secured to the beam 10 and to the pair of beams 11. At an intermediate point they are braced in spaced apart relation by the brace 17 which is secured to both beams 16. At a point in the rear of the brace 17 the beams 16 are bent downwardly in order to lower the level of their rear ends which are supported by the rear truck. The rear truck will be described in detail in the subsequent description.

The frame above described carries two gangs of cultivators which are adapted to straddle a row of listed corn or similar crop and to cultivate on both sides thereof. These two gangs differ only as to position, which is right and left, and since the description of one applies to the other, only one of the gangs will be described in detail.

The castings 15 are all formed with U-shaped portions as best shown in Figures 5 and 6, and each casting has secured thereto in its U-shaped portion a spool 18, the position and shape of the spool being such that in section the space between the spool and the bottom of the casting 15 is substantially circular. The spool is rotatably secured on a spindle in the U-shaped portion of the casting 15. There is a pair of castings 15 with spools 18 on each side of the center line of draft of the implement and each pair supports a tubular beam 19. As hereinafter described the beam 19 carries the furrow wheels and all of the earth working tools. It has both a rotatable and a slidable connection with its pair of castings 15 and spools 18, and since its upward thrust is against the spools 18 the friction of its sliding movements is materially reduced by the spools. Stops 20 are secured to the tubular beam 19 at both of its extremities, the stops being of any approved form and having the function of limiting the slidable movements of the beam 19 for preventing the accidental disengagement of the beam from its supports.

Each tubular beam 19 comprises a shiftable member and supports a pair of yokes consisting of castings 21, each of the castings having a pair of sleeves 22 which snugly encircle the beam 19. The beam 19 is provided with two series of horizontal apertures 23 and the outer sleeve of each pair has an aperture whereby the sleeve may be rigidly secured to the beam by means of a bolt. By sliding the castings 21 on the beam 19 and locking them in the suitable apertures 23 the castings may be laterally adjusted and properly spaced.

The casting 21 has secured thereto a pair of supporting arms 24 and a casting 25, the arms 24 engaging the front face of the casting 21 and projecting downwardly and the casting 25 engaging the rear face of the casting 21 and projecting rearwardly. Both faces of the casting 21 are heavily ribbed for seating the supporting arms 24 and the casting 25. The supporting arms and the castings are held rigidly secured together by means of a pair of bolts. The disc supporting arm 26 is connected with the casting 25, being positioned on the under side thereof and having axial adjustment with respect to the casting 25 about a vertical axis. The casting 25 is provided near its rear end with a transverse arcuate slot 27 for receiving a bolt which also passes through a registering aperture in the disc supporting arm 26. By this means the disc supporting arm may be adjusted about its connection with the frame and locked in any desired position of adjustment. At the rear of the casting 25 and immediately forward of the slot 27 there are two laterally projecting ears 28 to which are secured the upper ends of the braces 29 the lower ends of which are secured to the supporting arms 24. A furrow wheel 30 is journalled to and between the two arms of each pair of arms 24 at their lower extremities. The drag on the furrow wheels 30 is taken care of by the braces 29, thus affording an exceedingly rigid construction for the cultivator frame.

Both discs of each pair are raised and lowered by means of the lever 31 which is provided with the usual pawl and ratchet mechanism for locking it in adjusted position. The casting 32, which is bolted or otherwise secured to the beams 11, carries the arcuate upstanding ratchet 33. The lever 31 is rigidly secured at its forward end to the casting 34 which is pivotally connected to the beam 10 or rather to a U-shaped strap which is secured to the beam 10. The depending portion of the casting 34 consists of two arms which are connected through the links 35 to the furrow wheel journal boxes. The spring 36 connects the depending portion of the casting 34 with a downwardly and rearwardly projecting arm on the casting 32 and it acts as a counterbalancing spring and materially assists in the raising and lowering of the earth working tools.

Secured to the arm 26 at its lower or rear end is the disc support 37 which is secured to the arm 26 in such a manner that the support may be adjusted about a horizontal axis. The slot and pin connection 38 serves both as a guide for the arcuate movement and as a lock for holding the parts in their adjusted position. The disc support 37 has journalled thereto the disc 39 with the usual grease cup 40.

The upstanding loops 41 are integral with castings which are bolted to bear against the upper surfaces of the castings 25. The outer one of each pair of loops is free but the inner loop 41$^a$ has integral therewith the ratchet 42 which cooperates with a pawl on the lever 43. The square rod or tube 44 passes through both loops 41 of the pair, the connection being such that it may be turned about a horizontal transverse axis. The lever 43 is rigidly secured at its lower extremity to the rod 44 and it serves as a means for rocking the rod 44 about its axis and for locking it in adjusted position. Castings 45 are clamped or otherwise secured to the rod 44 at or near each of its ends, the castings 45 being adapted to support the beams 46 having the cultivator shovels at their rear ends. The beams 46 are laterally adjustable about axes in the castings 45 by means of an arcuate slot and pin connection similar to the connection between the supports 26 and the castings 25. The cultivator shovels may be raised and lowered by manipulating the levers 43, the handle ends of which are positioned in proximity to and on opposite sides of the driver's seat.

The rear supporting truck for the cultivator is shown in Figure 1. The two beams 16 are connected at their rear ends by a casting 50 which is rigidly secured to both beams. The casting is provided with a pair of rearwardly projecting looped portions 51 and with a central aperture. The cross bar 52 passes through both loops 51 and is pivotally connected with the casting 50 through the central aperture so that the cross bar has limited rocking movement relative to the cultivator frame. The bolt which serves as a pivot for the cross bar also passes through any desired one of the apertures 53 in the seat support 54, the support being positioned between parallel webs in the casting to prevent the rocking of the seat support about its connection with the casting 50. The seat may thus be adjustably secured at any desired height. The cross bar 52 has a pair of parallel vertical sleeves 55 secured thereto at its opposite ends, the sleeves being adapted to receive the wheel standards 56. For purposes of adjustment the standards 56 have a slidable relation with respect to the sleeves 55, and for securing the standards 56 in adjusted position each standard is provided with a pair of collars 57, one above and the other underneath the sleeve, and these collars 57 are held in their fixed positions by the usual set screws as shown. The standards 56 are bent inwardly in a horizontal direction, then downwardly and rearwardly, and finally outwardly in a horizontal direction, the last mentioned bent portion being the axis for the rear supporting wheel 58. The bends are located at such points that the standards will clear both the peripheries and the inner sides of the wheels.

The standards 56 have free axial movement in the sleeves 55 but the height of the rear end of the cultivator may be adjusted by means of the collars 57. The pair of wheels 58 is so spaced that it is adapted to straddle a row of standing corn or other crop and to travel on the newly cultivated soil in the adjacent furrows. Such soil is often apt to be cloddy, but since the wheels 58 are in effect free swinging caster wheels they will readily adapt themselves to the clods or other irregularities. If one furrow is at a different level from the other or if one of the wheels 58 should climb the furrow wall, the cross bar 52 will tilt on its pivot without disturbing the level of the implement frame. There are three adjustments in the rear truck: the adjustment in the spacing of the wheels 58, the adjustment in height of the rear end of the implement frame, and the adjustment in height of the seat. All parts through which these adjustments are made are of the simplest possible construction and the adjustments can be made in the minimum of time.

The draft appliance and equalizer as shown in Figure 1 is specially adapted for use on our cultivator. The levers 59 are pivoted at their inner ends to the beam 10 so as to project a suitable distance beyond the ends of the beam 10. The links 60 project rearwardly from the levers 59 at the pivotal points and the bracing links 61 connect the rear ends of the links 60 with the levers 59. The link 62 is pivotally connected to both links 60 at their rear ends. It is obvious that a forward or rearward movement of the outer end of either of the levers 59 results in a movement in the opposite direction of the outer end of the other lever 59. By means of this device the cultivator tends to maintain a straight course of travel under variations in the forward pull on the opposite ends of the beam 10. At the outer end of each of the levers is a clevis 63 for the doubletrees, and rigidly secured to the beam 10 at its middle portion is the tongue support 64. The implement is designed to be drawn by four horses each walking in its own furrow and the two middle horses walking in the furrows which are being cultivated.

Our implement is especially designed for cultivating listed corn and similar crops. The furrows between the rows of listed corn are relatively deep and they have relatively steep sides. During the travel of the implement the sloping sides of the furrow exert pressures in opposite directions on the two furrow wheels 30 which travel in the same furrow. The wheels 30 are however a part of the tool frame which has a floating relation with respect to the implement frame, so that any unevenness in the lateral pressures of the furrow walls on the two furrow wheels 30 of the pair immediately causes the lateral shifting of the entire tool frame to maintain the two pressures in equilibrium. The result of this is that the cultivating discs 39 and the shovels 47 maintain their true course within a limited range even when the furrows and rows are not parallel. The entire upward thrust of the tool frame is directed against the two antifriction spools 18 of the pair and the beam 19 is so snugly seated against these spools that the lateral movements of the tool frame are exceedingly sensitive to any irregularities in the furrow At the same time, displacement of the tool frame relative to the main frame is effectively prevented by the yokes which prevent downward movement of the beam 19 and by the stops 20 which limit the lateral movements of the beam 19.

The angle of cut of the discs is regulated through the adjusting devices 37 and 38 and the discs are spaced and positioned relative to each other and to the furrow by swinging the disc supporting arms 26 laterally on their pivots and then tightening the bolts to hold the arms in their adjusted positions. By means of these two adjustments any desired axial or lateral adjustment can be obtained and maintained. The cultivator shovels 47 have the usual break pin connections which will yield when the shovels strike obstructions which might otherwise injure them. The shovels may be adjusted laterally by adjusting the beams 46 on their pivots and locking them in adjusted position. The shovels work the earth near the corn row and the discs operate in the furrow between the two shovels of the pair, and by properly spacing these tools and adjusting the discs angularly all or any desired portion of the furrow may be worked.

The relative depths at which the shovels and discs are to cut may be varied by manipulating the lever 43 so as to raise or lower the cultivator shovels about their axis. In listed corn the ridges are comparatively high at the beginning of the season but the surface of the ground tends to become more nearly level as the season advances. This of course necessitates readjustment for the successive cultivations, this being brought about through the use of the levers 43. In some cases it is desirable to cultivate with the discs alone or with the shovels alone, and when such conditions are met with it will be found that the range of movement of the shovels 47 about their axis at 44 is sufficient in both directions to either position the shovels so far under the discs that the shovels alone can work the soil or to position them so far above the discs that the shovels can not touch the surface when the discs are working at their maximum depth.

The depth at which the discs work is regulated entirely through the levers 31. These levers raise and lower the floating frames on their axes, and after the shovels and discs have been adjusted relatively to each other all of the tools may be raised out of operative position or lowered and adjusted for soil working depth by means of the levers 31.

We have described the cultivator in considerable detail with reference to its use as a cultivator for corn or other crops growing in lister rows. The implement has however another and equally important use. The conservation of soil moisture is recognized as imperative in the most successful agricultural practice, and one of the methods of conserving such moisture includes the plowing of the fields with lister plows after the crop has been removed and then breaking up or "busting" the lister ridges before planting the new crop. When the blank lister ridges and furrows are allowed to remain through the winter the snow is effectively prevented from being blown away and the alternate freezings and thawings thoroughly mellow the top soil. In carrying out this method our cultivator is admirably adapted for breaking up the ridges when preparing the seed bed for the new crop. When the cultivator is to be used for this purpose then discs should be substituted for the shovels 47, no other alteration being necessary.

Having thus described our invention in terms which will be readily understood by others skilled in the art to which it pertains, what we believe to be new and desire to secure by Letters Patent of the United States is:—

1. An implement frame having a pair of depending U-shaped castings, a spool rotatably secured in each of said castings, a tubular beam passing through both of said castings underneath said spools and bearing upwardly against said spools, said beam being slidable in the direction of its length, a second casting secured to and depending from said beam, and supporting wheels and earth working tools carried by said second casting.

2. An implement frame having a pair of depending U-shaped castings, anti-friction devices in each of said yokes, a tubular beam passing through both of said castings underneath said anti-friction devices and bearing upwardly against said anti-friction devices, said beam being slidable in said castings in the direction of its length, a second casting secured to and depending from said beam, and supporting wheels and earth working tools adjustably carried by the said second casting.

3. An implement frame having a pair of depending U-shaped castings, anti-friction devices in each of said castings, a tubular beam passing through both of said castings underneath said anti-friction devices and bearing upwardly against said anti-friction devices, said beam being slidable in said castings in the direction of its length, means on said beam for limiting its movements, a second casting secured to and depending from said beam, and supporting wheels and earth working tools carried by the said second casting.

4. An implement frame having a pair of depending U-shaped frames, anti-friction devices in each of said castings, an elongated tubular beam passing through both of said castings underneath said anti-friction devices, said beam having limited but free sliding movement in the direction of its length, a second casting secured to and depending from said beam, and furrow wheels and earth working tools carried by the said second casting, said furrow wheels controlling the slidable movements of said beam.

5. An implement frame having a pair of depending U-shaped castings, anti-friction devices in each of said castings, an elongated tubular beam passing through both of said castings underneath said anti-friction devices, said beam having limited but free sliding movement in the direction of its length, furrow wheels and earth working tools carried by the said beam, and means for adjusting said furrow wheels and earth working tools about said beam as an axis.

6. An implement frame having a pair of depending U-shaped castings, an elongated tubular beam passing through both of said castings and having limited sliding movement in the direction of its length, two pairs of supporting arms secured to said beam, furrow wheels journalled to and between said supporting arms at their lower extremities, and earth working tools secured to and projecting rearwardly from said beam.

7. An implement frame having a pair of depending U-shaped castings, an elongated tubular beam passing through both of said castings and having sliding movement in the direction of its length, a second pair of castings secured to said beam, a pair of supporting arms secured to each of said second mentioned castings, furrow wheels journalled to and between said supporting arms at their lower extremities, and a rearwardly and downwardly projecting arm secured to one of said second mentioned castings, said rearwardly and downwardly projecting arm having means for securing earth working tools thereto at its rear extremity.

8. An implement frame having a pair of depending U-shaped castings, an elongated tubular beam passing through both of said castings and having limited sliding movement in the direction of its length, a second pair of castings adjustably secured to said beam, a pair of supporting arms secured to each of said second mentioned castings, furrow wheels journalled to and between said supporting arms at their lower extremities, and a rearwardly and downwardly projecting tool supporting arm secured to one of each of said second mentioned castings, said tool supporting arm being adjustable about a vertical axis on said second mentioned casting.

9. In an implement frame, a shaft positioned transversely thereof, two pairs of supporting arms secured to said shaft, supporting wheels journalled to and between said supporting arms at their lower extremities, a rearwardly and downwardly inclined arm secured to said shaft, and earth working tools secured to said last named arm at its rear extremity.

10. In an implement frame having a pair of U-shaped castings, a pair of parallel transverse shafts one in the rear of the other and connecting the castings at their lower extremities, arms projecting downwardly and rearwardly from both of said shafts, earth working tools carried by each of said arms at their rear extremities, means for adjusting said arms laterally on their respective shafts, means for adjusting each of said arms angularly about vertical axes, means for adjusting the arm carried by the rear transverse shaft about the axis of the rear transverse shaft, and means for adjusting both of said arms about the axis of the forward transverse shaft.

11. In combination, a wheel supported implement frame, a shiftable member secured to said implement frame and freely slidable transversely thereof, a pair of relatively adjustable yokes secured to said member, each of said yokes having a furrow guide wheel journalled therein, and earth working tools secured to said yokes whereby said furrow guide wheels will independently guide the movements of said earth working tools independently of the movements of said implement frame.

12. In combination, a wheel supported implement frame, a shiftable member which is freely slidable transversely of said implement frame, said member being secured to said implement frame, a depending yoke secured to said member, a furrow guide wheel rotatably secured to said yoke, and an earth working tool secured to said member whereby said furrow guide wheel will guide the movements of said earth working tool independently of the movements of said implement frame.

13. In combination, a wheel supported implement frame and a shiftable member secured thereto and having free movement in directions transverse to said implement frame, means limiting the transverse movement of said member, a depending yoke adjustably secured to said member, a shaft connecting the arms of said yoke at their lower extremities, a furrow guide wheel journalled on said shaft, and an earth working tool secured to said member whereby said furrow guide wheel will guide the movements of said earth working tool independently of the movements of said implement frame.

14. In combination, a wheel supported implement frame and a shiftable member secured thereto and having free movement in directions transverse to said implement frame, means limiting the transverse movements of said member, a pair of depending yokes adjustably secured to said member, a furrow guide wheel journalled in the lower end of each yoke, and earth working tools secured to said yokes whereby said furrow guide wheels will guide the movements of said earth working tools independently of the movements of said implement frame.

15. In an implement frame having a pair of U-shaped castings, a shiftable member secured to said implement frame and freely slidable transversely thereof, a pair of depending yokes supported by said member, a rod carried by said yokes and parallel to and rearward of said member, arms projecting downwardly and rearwardly from said member and said rod, earth working tools carried by each of said arms at their rear extremities, a supporting wheel having means for securing it to said member, means for adjusting each of said arms and said supporting wheel laterally on said member and on said rod, means for adjusting each of said arms angularly about vertical axes, means for adjusting the arm carried by said rod about the axis of said rod, and means for adjusting both of said arms and said supporting wheel about the axis of said member.

In witness whereof we affix our signatures.

LEON W. CHASE.
JAMES SMETHERS.
JAMES C. BRAND.
ALEXANDER H. BARNHART.